MULTIPLE FUNCTION CIRCUIT

Filed Jan. 25, 1962

INVENTOR.
RUDOLF RAINER
BY Frank R. Jeifari
AGENT

United States Patent Office 3,210,566
Patented Oct. 5, 1965

3,210,566

MULTIPLE FUNCTION CIRCUIT

Rudolf Rainer, Vienna, Austria, assignor to North American Philips Company, Inc., New York, N.Y., a corporation of Delaware Filed Jan. 25, 1962, Ser. No. 168,619
Claims priority, application Austria, Mar. 9, 1961, A 1,940/61
5 Claims. (Cl. 307—88.5)

The invention relates to a transistor amplifier which can be selectively switched to serve a number of different functions.

Amplifiers which can serve two functions may be used, for example, in receivers adapted for the selective reception of frequency-modulated signals and to amplitude-modulated signals. In such receivers one stage may be constructed so that it is connected as a self-oscillating mixing stage for AM reception, to receive the AM-signals directly from the aerial. For FM-reception the stage operates as an intermediate-frequency amplifying stage, in which case the intermediate-frequency signals to be amplified are obtained from an additional unit which usually comprises a preliminary amplifying stage and a mixing stage. This additional unit is not utilized for AM reception. Such stages may employ transistors. Also in other combinations, complete amplifying units are frequently switched on or off for the selection of functions.

It is furthermore generally known that for the optimum use of an amplifying element, i.e., an electron tube or a transistor, it is necessary, in changing the function of the stage, to change the adjustment of the working-point of the element. This adjustment is especially necessary when transistors are employed. Various methods are known for this purpose. With transistors, for example, in which the working-point is stabilized by a base voltage divider, use is made of two different dividers, to which the base is selectively connected. According to another arrangement the voltage division ratio of the base voltage divider, and hence the current adjustment of the transistor, is changed by selectively switching resistors in the circuit. The switching contacts required for the selection are provided on a function switch, which is also provided with additional switching contacts required for the function selection, so that, when the amplifier function is changed, the change may be made with only one switch.

An object of this invention is to provide an arrangement for changing the function of a transistor amplifier, which is simple and economical, and in which the optimum working-point adjustment of the transistor is maintained.

In accordance with the invention, a transistor amplifier is provided which can be selectively adapted to serve different functions by switching an amplifying unit on or off. During the function change in amplifying stages which have several functions the adjustment of the working point of the transistor is changed. The transistor base is connected to a voltage divider. A resistor is provided in the supply line of the unit to co-act with the voltage divider of such amplifying stages in such a manner that the resistor at least partially determines the bias between control electrodes of the transistor.

In other advantageous embodiments of the invention when a number of transistors have working-points which must be varied, a common resistor is provided. This resistor may be a smoothing resistor of a decoupling member. The invention may also be employed advantageously in transistor stages in which the working-point must be changed, wherein pnp-transistors and npn-transistors are used side by side.

With respect to the known arrangements, the invention provides the important advantage that the variation of the working-point adjustment of any number of transistors can be accomplished by means of a switching contact of a function switch, the contact of the switch being also used for switching an amplifying element on and off. In addition, while each stage, the working-point of which is to be changed, comprises at the most one additional resistor, or all stages require only one common resistor and that for the change-over of the working-point adjustment no measures need be taken for switching. As a result, for example, all conductors required for the otherwise required switching contacts can be omitted. The arrangement thus provided is free of undesirable couplings to the optimum extent. Therefore, an arrangement according to the invention requires a minimum number of assemblies and switching contacts and is, moreover, particularly simple and stable.

The invention will now be described more fully by way of example with reference to the embodiments shown in the drawing.

Figure 1:
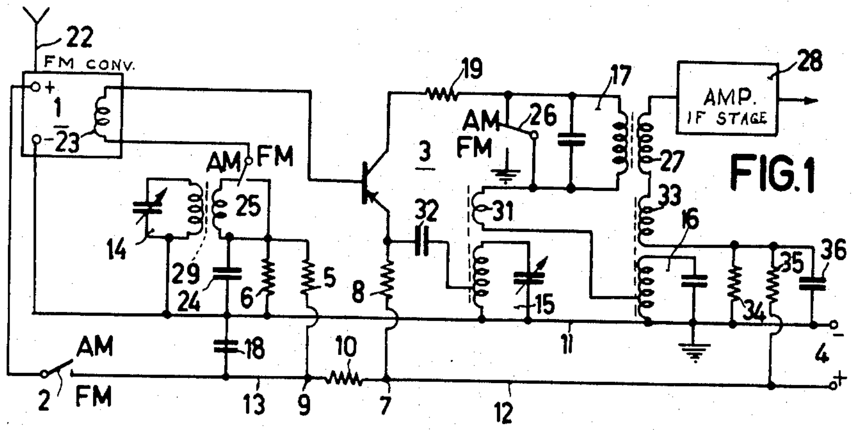
FIG. 1 shows the circuit of a transistor stage, adapted to be selectively employed as an AM-mixing stage or an FM-intermediate-frequency amplification stage; in this circuit the reference conductor is connected to the negative terminal of the voltage source.

FIG. 1 shows a portion of a receiver, adapted to receive AM-FM-signals. The FM-signals are supplied by an antenna 22 to a unit 1. This unit 1 comprises means for converting the incoming FM-signals into frequency-modulated intermediate-frequency signals. For this purpose the unit 1 may comprise amplifying, mixing and oscillating stages, which are well-known in the art and which therefore need not be further disclosed. The supply voltage for the unit 1 is delivered by a supply voltage source 4 through a conductor 12, a resistor 10, a conductor 13 and a switching contact 2 of the function switch. This contact is closed during FM-reception and open during AM-reception. The supply voltage for the unit 1 is smoothed by a smoothing capacitor 18.

The intermediate-frequency FM-signals are developed across an output coil 23 of the unit 1 and applied to the base electrode of a transistor 3. The lower end of the coil 23 is grounded during FM-reception by a by-pass capacitor 24 by way of a switching contact 25, connecting the lower end of the coil to the capacitor 24 during FM-reception. A base-voltage-divider, consisting of a grounded resistor 6 and a resistor 5, which is connected to supply line 13 at supply point 9, provides the required direct-current potential for the base electrode of transistor 3. This transistor 3 is also provided with an emitter resistor 8, which is connected to the supply line 12 at supply point 7. A collector resistor 19 is connected to the collector electrode.

The intermediate-frequency FM-signals are amplified by the transistor 3 and applied by way of resistor 19 to the upper end of a resonant circuit 17 tuned to the FM intermediate-frequency. During FM-reception the lower end of this resonant circuit is grounded by means of a switching contact 26. A coil 27, which is magnetically coupled to the resonant circuit 17, serves to couple the FM-signals to further amplifying stages 28.

For the reception of amplitude-modulated signals the arrangement of FIG. 1 is provided with an antenna rod 29, which may be tuned to the desired AM-signals by means of a tunable resonant circuit 14. A coil 30, which is wound on the antenna rod 29 is connected at one end to the by-pass capacitor 6. The switching contact 25 connects the other end of coil 30 to the lower end of coil 23 during AM-reception. The coil 23 forms a short circuit for AM-signals, so that the AM-signals, developed across the coil 30 appear at the base electrode of the transistor 3.

During AM-reception the resonant circuit 17 is short circuited by means of the switching contact 26 and a coil 31 is connected to the collector lead of the transistor 3. A tunable resonant circuit 15 is magnetically coupled to the coil 31 and is connected by way of a capacitor 32 to the emitter electrode of transistor 3, thus constituting a feed-back loop, which causes the transistor 3 to oscillate on the frequency to which the circuit 15 is tuned. The AM-signals applied to the base electrode of transistor 3 and the oscillator voltage applied to its emitter electrode, cooperate according to the well-known mixing process to produce an AM-intermediate-frequency signal in the collector lead of the transistor. This signal is applied through coil 31 to a resonant circuit 16 tuned to the intermediate-frequency. These signals are magnetically coupled to a coil 33 and fed to the input of the amplifier 28. Two resistors 34 and 35, which are bypassed by a condensor 36 serve to deliver the proper direct-current bias for the first stage of the amplifier 28.

From the above it follows that the function of the transistor 3 is different in AM-reception from its function in FM-reception. In FM-reception the transistor 3 acts as an intermediate-frequency amplifier, while in AM-reception this transistor acts as a self-oscillating mixing stage. It has been found that the transistor 3, operating as a mixing stage, should be adjutsed to a lower direct-current than when operating as an intermediate-frequency amplifier. In order to accomplish this change of the working-point adjustment without the necessity of an additional switching contact of the function switch, the resistor 10 is included in the supply conductor of the unit 1 and the base and emitter resistors 5 and 8 are connected to different ends of the resistor 10.

During AM-operation the ultra shortwave unit 1 is switched off by the contact 2 and the transistor stage 3, which is connected as an AM-mixing stage, is adjusted to a comparatively low current by the circuit elements 5, 6, 8, 10. If a change to FM-reception is desired, the stage 3 is connected for its function as an FM-IF-stage and the ultra shortwave unit 1 is connected to the supply point 9 by closing contact 2, so that the supply current, which is drawn by the unit 1, also passes through the resistor 10, so that the voltage drop across this resistor increases. Since this resistor is included in the base-emitter circuit of the transistor stage 3, the base-voltage of the transistor is caused to become more negative with respect to the emitter voltage and consequently the collector current increases. As a result of the use of the resistor 10, the collector current can be made to increase to its optimum value for the function of the FM-IF-stage. In the arrangement shown the resistor 10 also serves as a smoothing resistor in cooperation which the smoothing capacitor 18.

While the invention has been described for application in an AM-FM-receiver, it may be noted that the invention may also be applied for other purposes in which a transistor stage serves for different functions and in which a unit is disconnected from the supply source for one of these functions. In contradistinction with the amplifier of FIG. 1 it may then be desirable to increase the collector current of the transistor 3 when the unit is disconnected. This may be accomplished, for example, by connecting the emitter resistor 8 to the supply point 9 and the base resistor 5 to the supply point 7.

Figure 2:
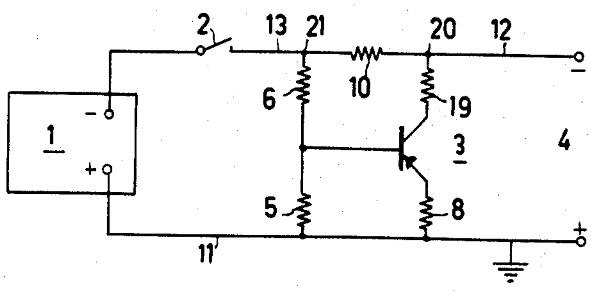
FIG. 2 illustrates a circuit according to the invention comprising a transistor stage, in which the reference conductor is connected to the positive terminal of the supply source, and in which all alternating-current circuit elements are omitted.

The arrangement of FIG. 1 shows a reference conductor 11 (ground) connected to a negative terminal of the source 4. FIG. 2 shows an example of an arrangement having a reference conductor 11 connected to the positive terminal of the voltage source 5. As in FIGS. 3 and 4, only the direct-current circuit elements are shown, whereas all alternating-current circuit elements, for example the coupling members of the stages, alternating-current load impedances, decoupling capacitors and the like are omitted. In FIG. 2 reference numeral 3 again designates the pnp-transistor stage, the function and the working-point adjustment of which can be changed over. Since the reference conductor 11 is formed in this case the conductor connected to the positive terminal of the current source 4, the emitter resistor 8 and the resistor 5 of the base voltage divider are directly connected to the reference conductor. The resistor 10 is connected between the supply point 20 of the collector circuit with the load resistor 19 and the supply point 21 of the base voltage divider 6, 5. If the contact 2 of the function switch is closed, the current of the amplifying unit 1 increases the voltage drop across the resistor 10, so that in contradistinction to the case described with reference to FIG. 1, the collector base voltage is raised and hence the collector current is reduced.

Figure 3:
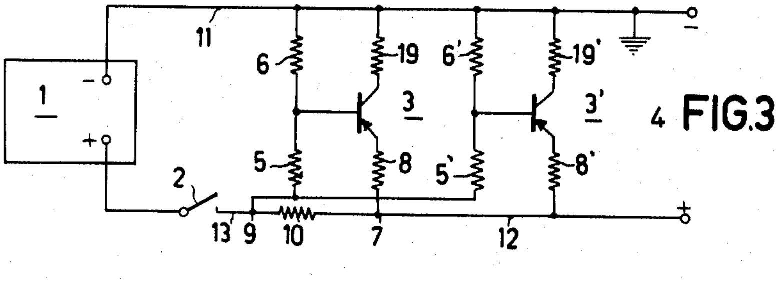
FIG. 3 illustrates a circuit according to the invention, in which all alternating-current circuit elements are also omitted; this circuit comprises two transistor stages in which the transistors have a common resistor.

In the arrangement shown in FIG. 3, which also shows only the direct-current circuit, the resistor 10 is common to a number (in this case two) of transistor stages 3 and 3', the working-point adjustment of which can be varied; the change-over of the working-point adjustment is performed by switching the unit 1 on or off by means of the contact 2. As in the embodiment shown in FIG. 1, the change-over of the units 1 results in an increase in the collector currents in the stages 3 and 3'.

Figure 4:
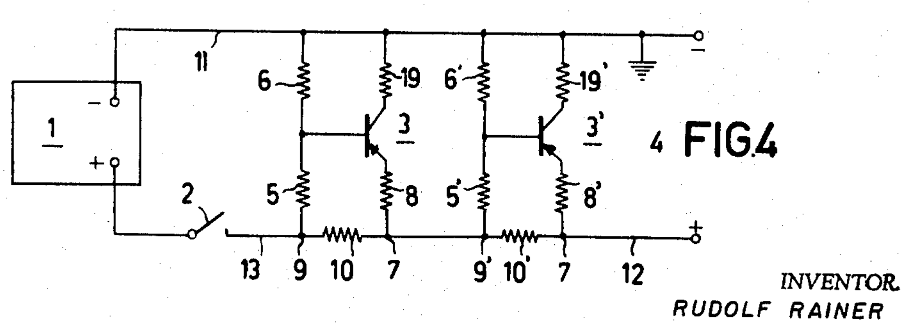
FIG. 4 shows a circuit according to the invention comprising two transistor stages, the working-point adjustment of which can be changed; each of these stages have a separate resistor for changing the working-point.

FIG. 4 shows a further embodiment comprising two stages, in which again only the direct-current circuit elements are shown. However, the resistor 10 is not common to these stages, but each of the stages 3 and 3' has its own resistor 10 and 10' respectively. In order to cause the current passing through the supply conductor 13, which can be interrupted, to flow not only through the resistor 10 of the stage 13 but also through the resistor 10' of the stage 3', the two resistors 10 and 10' are connected in series. The supply conductor 13 is connected to this end directly to the supply point 9 and indirectly to the supply point 9'. This arrangement has the advantage that, when using the resistors 10 and 10' as smoothing resistors, the alternating-current decoupling of the stages relative to each other is particularly effective.

The arrangements shown in FIGS. 3 and 4 may, of course, be extended to two or more commutatable transistors stages. Moreover, the series-connected resistors 10 and 10' may also be used in an arrangement as shown in FIG. 2 with a positive reference conductor.

The function described in these embodiments is not restricted to pnp-transistors, but also applies to npn-transistors, in which case, however, with the same polarity of the reference conductor, for example as in FIGS. 1 and 2, the current variation must be in opposite sense, i.e. in the case of a positive reference conductor the current in npn-transistors is higher and in the case of a negative reference conductor it is lower. If with a larger number of transistor stages, the working-point adjustment which is to be changed over, both pnp- and npn-transistors are employed, an opposite current variation may therefore be obtained in the separate stages.

What is claimed is:

1. A multiple function circuit comprising at least a first circuit having a transistor and a second circuit requiring operating current, wherein said first circuit has a first function when said second circuit is operative and a second function when said second circuit is inoperative, a source of direct current operating voltage having first and second terminals, a resistor having one end connected to said first terminal, a function switch, means serially connecting said function switch and said second circuit between said second terminal and the other end of said resistor whereby operating voltage is supplied to said second circuit when said switch is closed, said transistor having input, common and output electrodes, output circuit means connected to said output electrode, means connecting one of said input and common electrodes to a terminal of said source, and means connecting the other of said input and common electrodes to said other end of said resistor, whereby the voltage drop across said resistor when said function switch is closed biases said transistor to a different working point than when said switch is open.

2. A multiple function circuit comprising at least a first circuit having a transistor and a second circuit requiring operating current and having an operating current circuit, wherein said first circuit has a first function when said second circuit is operative and a second function when said second circuit is inoperative, a source of direct current operating potential having first and second terminals, a first resistor having one end connected to said first terminal, a function switch, means serially connecting said function switch and operating current circuit between said second terminal and the other end of said resistor whereby operating current is supplied to said second circuit when said switch is closed, said transistor having input, common and output electrodes, means connecting one of said input and common electrodes to one terminal of said source, means connecting said output electrode to the other terminal of said source, second and third resistors serially connected between said second terminal and the other end of said first resistor, and means connecting the other of said input and common electrodes to the junction of said second and third resistors, whereby the voltage drop across said first resistor when said function switch is closed biases said transistor to a different working point than when said switch is open.

3. A multiple function circuit comprising at least a first circuit having a transistor and a second circuit requiring operating current and having an operating current circuit, wherein said first circuit has a first function when said second circuit is operative and a second function when said second circuit is inoperative, a source of direct current operating potential having first and second terminals, a first resistor having one end connected to said first terminal, a function switch, means serially connecting said function switch and operating current circuit between said second terminal and the other end of said resistor whereby operating current is supplied to said second circuit when said switch is closed, said transistor having emitter, base and collector electrodes, means connecting said collector electrode to said second terminal, means connecting said emitter electrode to said first terminal, second and third resistors serially connected between said second terminal and the other end of said first resistor, and means connecting said base electrode of said transistor to the junction of said second and third resistors, whereby the voltage drop across said first resistor when said function switch is closed biases said transistor to a different working point than when said switch is open.

4. A multiple function circuit comprising at least a first circuit having a transistor and a second circuit requiring operating current and having an operating current circuit, wherein said first circuit has a first function when said second circuit is operative and a second function when said second circuit is inoperative, a source of direct current operating potential having first and second terminals, a first resistor having one end connected to said first terminal, a function switch, means serially connecting said function switch and operating current circuit between said second terminal and the other end of said resistor whereby operating current is supplied to said second circuit when said switch is closed, said transistor having emitter, base, and collector electrodes, means connecting said collector electrode to said first terminal, means connecting said emitter electrode to said second terminal, second and third resistors serially connected between said second terminal and the other end of said first resistor, and means connecting said base electrode to the junction of said second and third resistors, whereby the voltage drop across said first resistor when said function switch is closed biases said transistor to a different working point than when said switch is open.

5. A multiple function circuit comprising at least a first circuit having a transistor and a second circuit requiring operating current, wherein said first circuit has a first function when said second circuit is operative and a second function when said second circuit is inoperative, a source of direct current operating voltage having first and second terminals, resistive means having one end connected to said first terminal, a function switch, means connecting said function switch and said second circuit in circuit arrangement with said resistor means whereby operating voltage is supplied to said second circuit when said switch is closed, said transistor having input, common and output electrodes, output circuit means connected to said output electrode, means connecting one of said input and common electrodes to a terminal of said source, and means connecting the other of said input and common electrodes to said other end of said resistor means whereby the voltage drop across said resistor means when said function switch is closed biases said transistor to a different working point than when said switch is open.

References Cited by the Examiner

UNITED STATES PATENTS

| | | | |
|---|---|---|---|
| 2,541,818 | 2/51 | Gruen | 325—317 |
| 2,637,808 | 5/53 | Herrick | 325—317 |
| 2,877,360 | 3/59 | Moore et al. | 307—88.5 |
| 2,959,717 | 11/60 | Conger | 317—148.5 |
| 3,107,307 | 10/63 | Sheffet | 307—88.5 |
| 3,134,033 | 5/64 | Cepuch et al. | 307—88.5 |

ARTHUR GAUSS, *Primary Examiner.*

NATHAN KAUFMAN, DAVID G. REDINBAUGH, *Examiners.*